United States Patent [19]

Kato et al.

[11] 4,022,689

[45] May 10, 1977

[54] ROTATING MULTITUBE BIOCONTACTOR FOR TREATING SEWAGE

[76] Inventors: Masashi Kato; Itsuko Kato; Shouichi Kato; Yasushi Kato; Takashi Kato, all of No. 5-2, 1-chome, Houjo, Daito, Osaka, Japan

[22] Filed: Apr. 12, 1976

[21] Appl. No.: 675,893

Related U.S. Application Data

[63] Continuation of Ser. No. 476,570, June 4, 1974, abandoned.

[30] Foreign Application Priority Data

June 20, 1973 Japan ............................. 48-70112

[52] U.S. Cl. .................................. 210/151; 261/92
[51] Int. Cl.$^2$ ......................................... C02C 1/04
[58] Field of Search ............... 210/150, 151; 261/92

[56] References Cited

UNITED STATES PATENTS

| 3,647,081 | 3/1972 | Engelbart | 210/150 |
|---|---|---|---|
| 3,827,559 | 8/1974 | Gass et al. | 210/150 |
| 3,837,492 | 9/1974 | DiBello | 210/150 |

FOREIGN PATENTS OR APPLICATIONS

| 1,934,501 | 1/1971 | Germany | 210/150 |

Primary Examiner—John Adee
Attorney, Agent, or Firm—Wenderoth, Lind & Ponack

[57] ABSTRACT

A rotary multitube biocontactor has a plurality of tubes of a predetermined length and diameter. The tubes are bundled in a pillar like form and are connected with each other and with an axle at the sectional center thereof by means of welding or the like. The plurality of tubes are at angles to the axle, the axle being mounted in bearings provided on a trough at the top of two sidewalls thereof so as to enable the axle to be located close to the surface of water contained in the trough. The axle is rotated by a motor connected thereto thereby rotating the multitube biocontactor so that the tubes move in and out of the water contained in the trough.

8 Claims, 11 Drawing Figures

ROTATING MULTITUBE BIOCONTACTOR FOR TREATING SEWAGE

This is a continuation application Ser. No. 476,570, filed June 4, 1974, now abandoned.

The present invention relates to a rotating multi tube biocontactor for purifying sewage and the like characterized in that said multitube biocontactor is an integration of multiple tubes each having a predetermined length and thickness, said multiple tubes bundled by a pair of rings or disks or contained in a cylindrical member, and the integrated body of the multiple tubes at the sectional center thereof fixed longitudinally to an axis which is rotatably held by bearings provided on a sewage trough at the top of both sidewalls thereof. Said axis rotates by the communication with a motor thereby enabling the multitube biocontactor to rotate while nearly half submerged in the sewage contained in said trough.

It is well known that aerobic micro-organisms naturally develop on the surface of a solid in sewage, and that said microorganisms to treat the sewage by means of dissolving the organic pollutants therein into carbon dioxide, water and microorganic cells in the process of contacting with the air and the water in alternation. This said process further results in the proliferation of said micro-organisms as a matter of course.

There have been conventional means for treating polluted water taking advantage of the above mentioned character of said microorganism such as (1.) The trickling biofilter; (2.) The rotating disk biocontactor; and (3.) The honeycomb multitube biocontactor.

These conventional means, however, are defective in various regards as described in the following: the trickling biofilter requires unsuitable magnification of the device in size and involves a sanitation problem; the rotary disc biocontactor requires a disk of larger size and weight unsuitable for the circumstance for which it is used, and said disk also needs a roof, which raises manufacturing cost of this device; and the honeycomb multi-tube biocontactor is less effective for purifying the sewage, and accordingly is available only for treating water of less pollution. This device also needs large amounts of power to operate.

The present invention provides a solution to the foregoing problems of the conventional devices by means of fixing multiple tubes around and unparallel with a rotary axis, thereby enabling said multiple tubes to rotate in and out of the sewage and resulting in the rapid development of aerobic micro-organisms on said multiple tubes on the inside and outside thereof, and thereby achieving a remarkable effectiveness for purifying said sewage by using said aerobic microorganisms.

A first object of the present invention is to provide a device for bioligically treating sewage more effectively than any of the conventional devices of this kind.

A second object of the present invention is to provide a device as above-mentioned comprising a group of thin walled tubes of predetermined length and diameter forming a habitat for aerobic micro organisms.

A third object of the present invention is to provide a sewage treating device smaller in size and weight, more durable, utilizing less power for operation, and manufacture at a lower cost than conventional devices of this kind.

A fourth object of the present invention is to provide a sewage treating device available also as an effective contactor for installation in cooling equipment.

These objects can be accomplished by the improvement, combination and operation of every part constituting this invention, the preferred embodiments of which will be illustrated in the annexed drawings and in detail as below.

Figure 1:
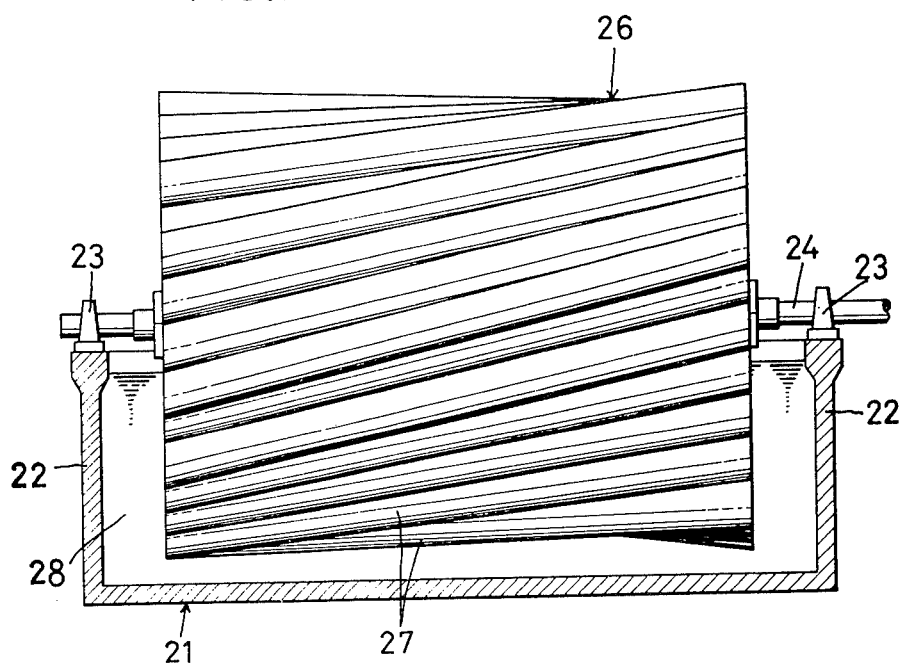
FIG. 1 is a longitudinal front section of this invention in the first embodiment.
Figure 2:
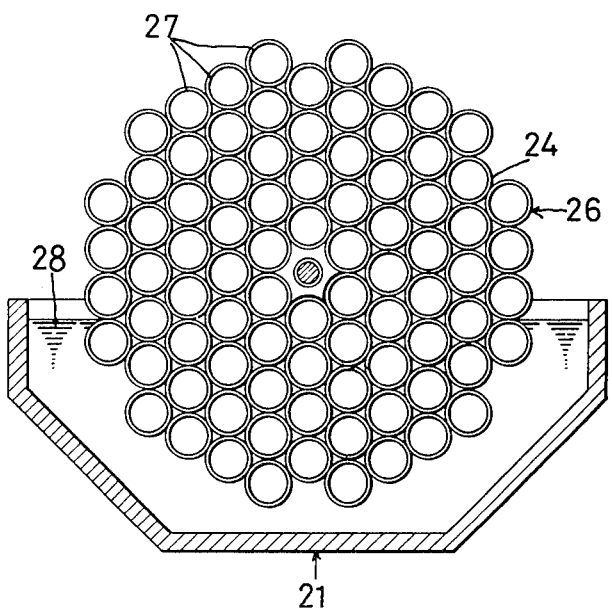
FIG. 2 is a longitudinal side view, of the above.

In the first embodiment shown in FIGS. 1 and 2, a trough 21 for containing sewage to a predetermined depth, is provided at the top of both sidewalls thereof with bearings 23 which held therethrough a rotary axis 24. Said axis 24 is spaced above the polluted water surface and linked to a motor (not shown), thereby enabling it to rotate. Said axis 24 also fixedly penetrates through a multitube biocontactor 26 at the sectional center thereof. Said biocontactor 25 is nearly half submerged in the polluted water contained in the said trough 21, is comprised of multiple tubes 27 of a predetermined length and diameter fixed to each other by means of welding and the like. The multitube biocontactor 26 as the integration of multiple tubes 27 is fixed also by means of welding and the like centripetally around and unparallel to said rotary axis 24, thereby enabling it to rotate in and out of said sewage to the accompaniment of rotation of said axis 24 at a low speed slow as only several revolutions per minute.

The multiple tubes 27 are made of synthetic resins such as vinyl chloride, polyethylene and the like characterized by being corrosion proof against pollutants, lighter in weight, and lower in cost.

No thick wall of said material is needed for constituting the multiple tubes 27, about 1 mm or less is acceptable as the required thickness.

In FIGS. 1 and 2, the multiple tubes 27 afford a habitat on the inside and outside surface thereof for the aerobic microorganisms, thereby allowing the biological development therewith.

Figure 3:
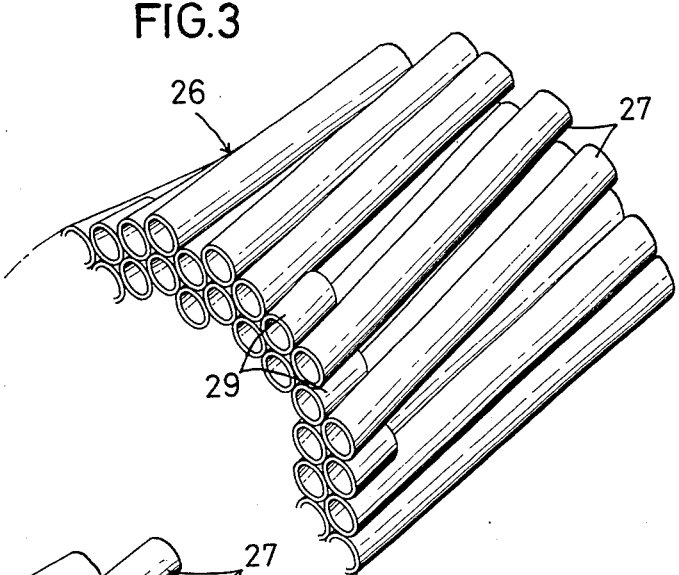
FIG. 3 is a partially cutaway perspective view of the above.

In FIG. 3, the multiple tubes 27 are shown interwoven with tubes having at one end thereof a short cylindrical cover 29 fitting thereto, said cover 29 creating a suitable space between neighboring tubes, thereby giving a rise to the contacting area of said tubes at the outer surface thereof.

FIGS, ranging from 4 to 11 show examples of the constitution of said multitube biocontactor 26.

Figure 4:
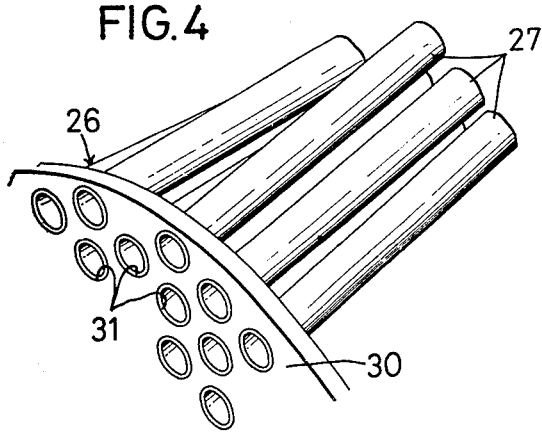
FIG. 4 is a partially cutaway perspective view of this invention in the second embodiment.

In FIG. 4, a perrous disk 30 has holes 31 in which to insert and fix said tubes 27 at both end portions thereof so to provide angles between said tubes 27 and the rotary axis 24, as in case of the examples described hereinbefore.

Figure 5:
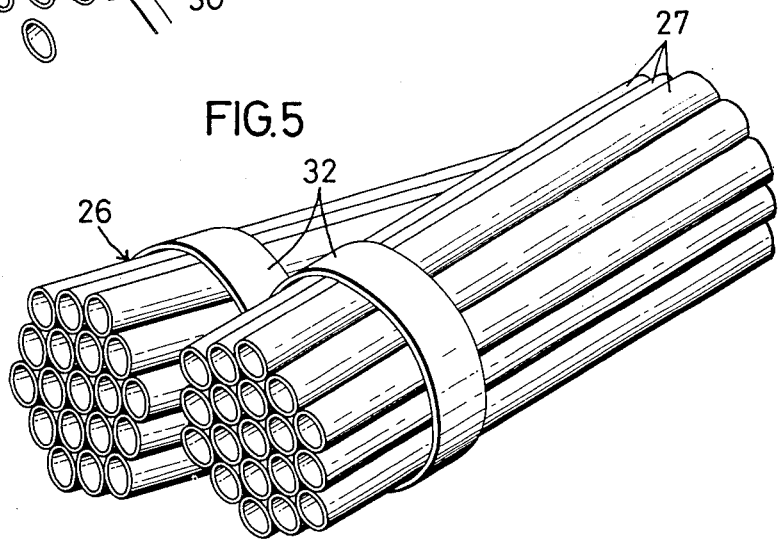
FIG. 5 is a perspective view of this invention in the third embodiment.

In FIG. 5 numeral 32 designates a ring bundling assembly of said tubes 27, a plural number of said rings 32 fixing over the assembly of said tubes 27 at many points thereof by means of welding and the like. Said tubes 27 are fixed parallel to each other by the same means, and a plural number of bundles of said tubes 27 thus produced are brought into unification by fixing them at the sectional center thereof to the rotary axis 24 at suitable angles as in the case of foregoing examples.

Figure 6:
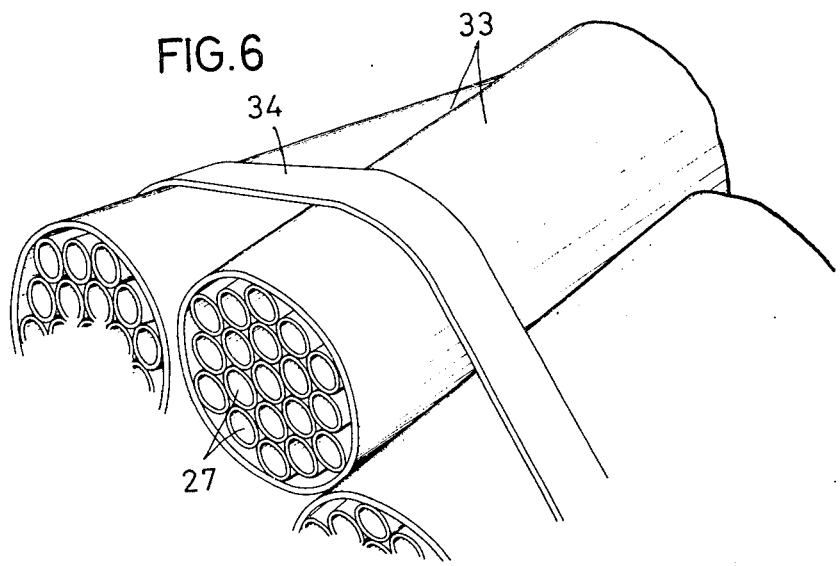
FIG. 6 is a partially cutaway perspective view of this invention in the fourth embodiment.

In FIG. 6 a cylindrical member 33 contains therein said contacting tubes 27 in a unified state in the same method as described hereinbefore. A plural number of the cylindrical members 33, said tubes 27 are contained as the above, are bundled into more than one ring 34. Said cylindrical members 33 are fixed each other and to the ring 34 also in the same method as described hereinbefore, so as to have suitable angles against the axis 24 which is provided in the same method and position as referred to in the foregoing examples.

Figure 7:
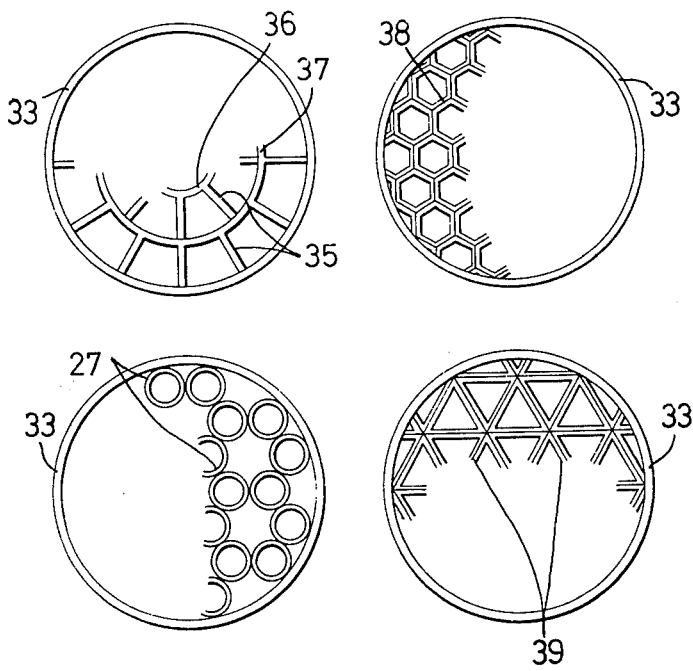
FIG. 7 is a partially cutaway sectional view of this invention in the fifth embodiment.

FIG. 7 shows examples of the fluid passages varying in sectional shape when contained in a cylindrical member as in case of FIG. 6, i.e. numeral 36, 37 and 38 designating trapezoid-like shapes numeral 38 designating hexagon and numeral 39 triangles as apparently seen in this drawing. The numeral 27 in this drawing indicates the mixture of said tubes 27 having a predetermined diameter and length so as to accord with the length of said cylindrical member 33 and tubes of the same diameter but shorter in length, thereby providing a vacancy widening the contacts therewith. In this example, said shorter tubes could be dispensed with for the same object also no matter which sectional formation of the contacting tubes is used, the thin walls of synthetic resin as mentioned hereinbefore may be used, as the construction material.

Figure 8:
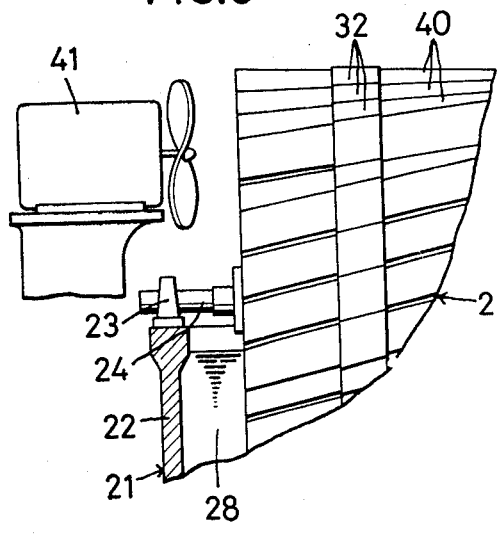
FIG. 8 is a partially cutaway front view of this invention in the sixth embodiment.
Figure 9:
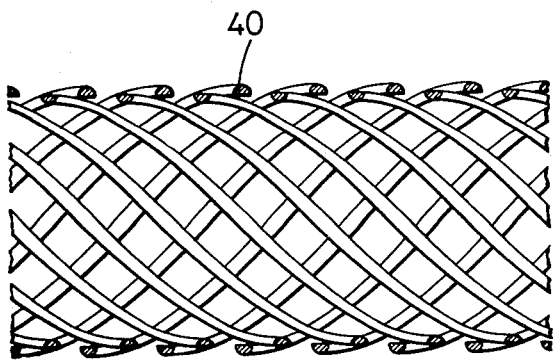
FIG. 9 is a longitudinal section of a wire tube to be comprised in a multitube biocontactor in this invention.

In FIGS. 8 and 9, a wire tube 40 is used instead of the afore-mentioned contactng tubes 27 for constituting the multiple biocontactor 26.

Said wire tubes 40 are preferred be to 2 cm to 7 cm in diameter, 2 mm to 3 mm thick, with meshes ranging from 3 mm to 15 mm, and made of synthetic resin having properties of elasticity, sturdiness and are easily molded. Said wire tubes 40 can be unified into the multitube biocontactor 26 in the same method as in case of the tubes 27.

When using said wire tubes 40, the meshes are likely to be staffed by the aerobic microorganisms presenting a scene of tubes as if formed by the microorganism themselves, but said tubes are none the less effective in a water purifying capacity.

When using wire tubes for treating less polluted water, for example as in a filtering system or a city water supply, the wires are preferred to be thinner than otherwise and meshes to be in the neighborhood of 5 mm or less.

The multitube biocontactor 26 comprising said wire tubes 40 is capable of absorbing light into every part inside the wire tubes 40 through the meshes in the process of rotation, thereby giving a raising the proliferation of light synthesized microorganisms which have a capacity for removing phosphorous and nitrogen compounds from polluted water. This biocontactor 26 comprising the wire tubes 40 could also be used as a water cooling equipment. That is, the wire tubes 40 when coming out of water have their meshes covered with a film of water, thereby forming temporarily flawless water tubes by themselves. When a blase of air sent from a blasting machine 41 makes a forced passage through said water tubes, the water films partially vaporize and radiate heat therefrom as the result, thus cooling the water when the above process is repeated.

Figure 10:
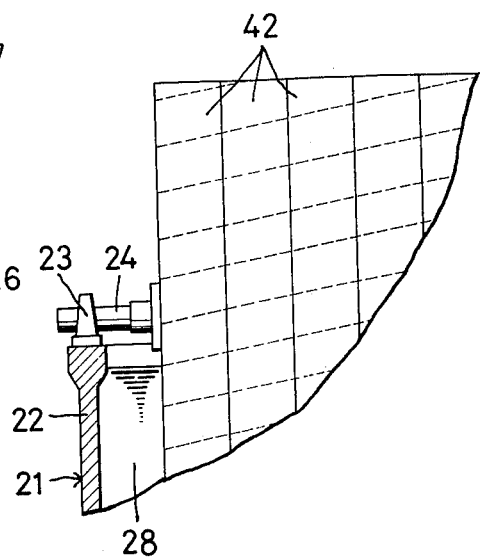
FIG. 10 is a partially cutaway front view of this invention in the seventh embodiment.
Figure 11:
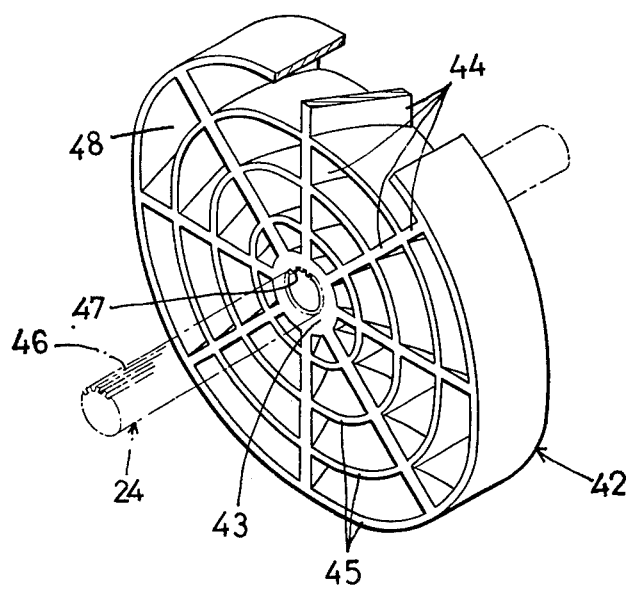
FIG. 11 is partially cutaway perspective view of the above.

In FIGS. 10 and 11, a circular member 42 is the main body of the rotating biocontactor 26. Said circular member 42 forms circular partition walls 45 and diametrical partition walls 44 therein, and diametrical partition walls 44 have angles longitudinally against the axis 24. A serration 46 is provided on the axis 24 and another serration on the boss 43 of the circular member 42 communicating with each other, thereby enabling the circular member 42 to rotate with the rotation of said axis 24. The partitions formed by the partition wall 44 and 45 play the role of the above-mentioned contacting tubes, needless to say.

The operation and functioning of the rotating multitube biocontactor will be given below:

With the rotation of the multitube biocontactor 26 to the accompaniment of the rotation of the axis 24 which is held close to the water surface, the contacting multiple tubes 27 or the partitions as described in FIG. 10 and 11 having suitable angles against the rotary axis 24 go in and out of the water contained in the trough, thereby repeating to taking water from the upper end and releasing it from the lower end at a suitably predetermined speed. Needless to say, when the entire body of a contacting tube 27 submerges, water fills therein completely, replacing the air therein with the water and vice versa as the contacting tube 27 stays above the water level. This function is held true with all the contacting tubes 27 in the foregoing embodiments and also with the partitions shown in FIGS. 10 and 11.

The afore-mentioned process results in the slow passage of the air and sewage through the contacting tubes 27 or the partitions 48 with every rotation, thereby causing the generation of aerobic microorganisms on the contacting tubes 27 or the partitions 48 at the inside and outside surfaces thereof. Said aerobic microorganisms thereby take oxygen nutrients from the air and the sewage, and accomplish the sewage treatement as the result.

If the aerobic microorganisms continue to proliferate, adding to the thickness of biological layer on the tubes 27 or the partitions 48 at the inside and outside surfaces thereof, thereby causing a decline in the supply of air thereinto, it will result in a natural discharge of the excessive microorganisms therefrom under the effect of the water flow.

In this invention, the sewage flows into the trough in two directions, one from the contacting tubes 27 or the partitions 48 diagonally and the other rotationally by the rotation of said biocontactor 26, thereby achieving a satisfactory contacting effect regardless of the fact that the rotating speed is only several revolutions per minute.

What is claimed is:

1. A rotary multi-tube bicontactor apparatus for treating fluids comprising:
an open trough for containing the fluid to be treated;
a rotary rod attached across said trough above the surface of the fluid therein;

rotating means attached to said rotary rod for rotating said rotary rod; and a plurality of tube means longitudinally askew to and surrounding said rotary rod, longitudinally askew to each other, partially submerged in the fluid in said trough, and operatively connected to said rotary rod for moving in and out of the fluid in said trough as said rod rotates, each tube means comprised of:

a plurality of tubes, and binding means surrounding said tubes for holding said tubes together, whereby a tube bundle is formed.

2. An apparatus as claimed in claim 1, wherein each tube is comprised of a network of wires formed in a tubular shape.

3. An apparatus as claimed in claim 1, wherein each tube is from 2cm to 7cm in diameter and is comprised of a network of wires 2mm to 3mm in thickness arranged in a longitudinal tubular shape with meshes ranging from 3mm to 15mm.

4. An apparatus as claimed in claim 1, wherein said binding means is comprised of at least one ring surrounding and holding said tubes together.

5. An apparatus as claimed in claim 1, wherein said binding means is comprised of a hollow, open-eyed cylindrical container surrounding and containing said tubes therein.

6. An apparatus as claimed in claim 1, wherein said tubes are bound together with vacant spaces therebetween.

7. An apparatus as claimed in claim 1, further comprising:

fan means directed toward said tube means above the surface of the fluid in said trough for forcing air across and through said tube means, whereby the fluid films picked up by the rotation of the tube means through the trough partially vaporize and radiate heat therefrom as a result of the air passing thereover from said fan means.

8. A rotary multi-tube biocontactor apparatus for treating fluids comprising:

a rotary rod above the surface of the fluid to be treated;

rotating means attached to said rotary rod for rotating said rotary rod; and a plurality of tube means longitudinally askew to and surrounding said rotary rod, longitudinally askew to each other, partially submerged in said fluid, and operatively connected to said rotary rod for moving in and out of said fluid as said rod rotates, each tube means comprised of:

a plurality of tubes, and binding means surrounding said tubes for holding said tubes together, whereby a tube bundle is formed.

* * * * *